Jan. 5, 1954
L. H. FLORA ET AL
2,665,103
SUPPORT
Filed Feb. 9, 1951
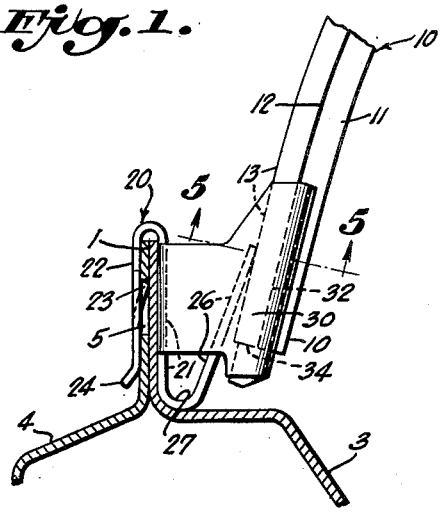
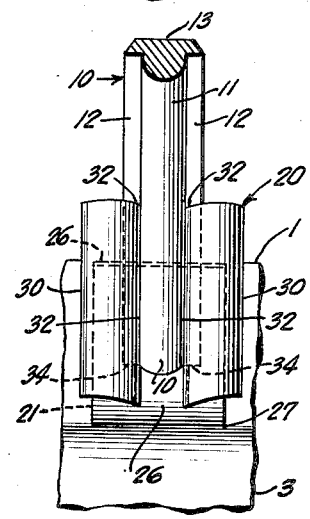
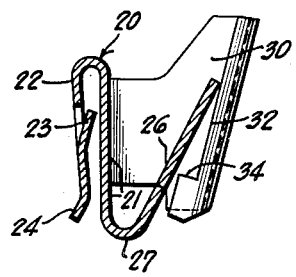
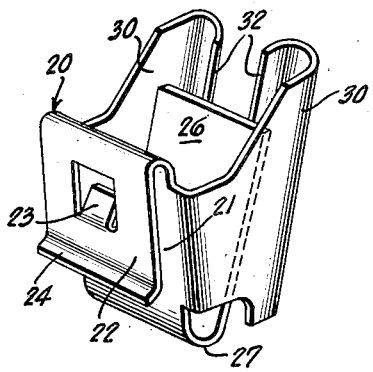
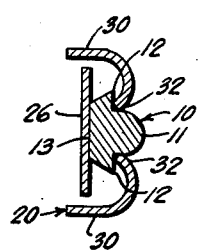
INVENTORS:
LAURENCE H. FLORA
JOHN BALINT
BY H. G. Lombard
ATTORNEY Patented Jan. 5, 1954

2,665,103

UNITED STATES PATENT OFFICE 2,665,103

SUPPORT

Laurence H. Flora and John Balint, Cleveland, Ohio, assignors to Tinnerman Products, Inc., Cleveland, Ohio, a corporation of Ohio Application February 9, 1951, Serial No. 210,110

3 Claims. (Cl. 248—314)

This invention relates in general to the installation of roof bows for the interior head linings of automobiles and the like, and deals, more particularly, with an improved, highly simplified construction of this character, in which a simple, inexpensive clip fastener is used as the supporting and securing means for the roof bow in mounted position in a completed installation.

While the invention has particular application and use in the installation of roof bows, such as described, the invention is equally adaptable to a wide range and variety of other applications and uses in assemblies wherein it is desired to mount a rod or similar article or object by supporting and securing the end portion thereof in connected relation with an associated part.

A primary object of the invention is to provide an installation and a clip fastener therefor, such as described, in which the clip fastener comprises means for attachment to a supporting part and cooperating spring members defining a resilient socket for gripping the end of a roof bow, rod or like article to secure the same against displacement in any lateral direction and to provide an abutment for supporting said rod or like article against endwise movement in mounted position in an assembly.

A further object of the invention is to provide a clip fastener of the kind described which is constructed as a simplified one-piece sheet metal device to include means for securing the same to a supporting part and a substantial socket comprising resilient elements for gripping a rod-like article or object under spring tension together with abutments for supporting the end of said rod-like article or object against endwise movement in mounted position in an assembly.

Another object of the invention is to provide a one-piece clip fastener of this character which comprises a clasp portion for attaching the same to a supporting part and resilient gripping elements for gripping the rod-like article or object on at least three surfaces to secure the same against displacement in any lateral direction together with abutments on a pair of said gripping elements for supporting the end of said rod or the like against endwise movement in mounted position in an assembly.

Further objects and advantages of the invention and other new and useful features in the construction, arrangement and general combination of parts thereof will be readily apparent as the following description proceeds with reference to the accompanying drawings, for purposes of illustration but not of limitation, in which like reference characters designate like parts throughout, and in which:

Fig. 1 is a vertical sectional view of an assembly in which one end of a roof bow is mounted onto a roof rail by the improved clip fastener of the invention, the clip fastener being shown in side elevation;

Fig. 2 is a side view from the right of Fig. 1 showing the improved clip fastener in front elevation and supporting the end of the roof bow in mounted position on the roof rail;

Fig. 3 is a vertical sectional view through the mid-portion of the clip fastener as seen in Fig. 1;

Fig. 4 is a perspective view of the clip fastener per se; and,

Fig. 5 is a sectional view of Fig. 1 along line 5—5 of Fig. 1.

Referring now, more particularly, to the drawings, Fig. 1 illustrates the general organization and arrangement in which one end of a roof bow 10 is supported and secured in mounted position on a roof rail in an automobile head lining installation, for example, it being understood that the roof bow is of the required length and contour to extend along the roof of the vehicle with the other end thereof secured and supported in mounted position in a similar manner on an opposite roof rail.

In the present example, the roof bow is shown as supported and secured in mounted position on a support in the form of a flange 1 composed of the juxtaposed edge portions of an inner roof rail member 3 and an outer roof rail member 4. Preferably an indent or recess is provided in said flange 1, as by a hole 5 adjacent the edge portion of the outer roof rail member 4 which serves to locate and retain the clip fastener 20 in applied position on said flange 1, with the clip supporting and securing the associated end of the roof bow 10. In the same general manner, the clip fastener may be employed in various other applications to mount on a supporting part any similar rod-like article or object. In the present construction, the roof bow 10 is provided in generally T-shaped cross-section comprising a substantially half-round rod portion 11 and laterally projecting ribs 12 extending lengthwise thereof and having a flat outer surface 13.

The improved clip fastener, designated generally 20, is constructed as a one-piece device from a single blank of resilient sheet metal preferably spring metal or cold rolled metal having spring-like characteristics. In general, the clip fastener is provided to comprise a central base or body portion 21 provided with an attaching portion 22 and carrying a resilient socket construction for receiving an end of the roof bow 10 in supported and secured relation. The attaching portion 22 may be employed to attach the clip in any desired manner as by a bolt or screw fastener, for example, and in the instant construction is provided as a return bent hook or leg member adapted to cooperate with the base or body portion 21 in clasping the flange 1 of the supporting part in attached position. The leg member 22 is stamped with a locking tab 23 or equivalent retaining element adapted to be received in the indent or recess 5 in said flange 1 to retain the clip in attached position, and said leg member 22, otherwise, has its extremity preferably flared outwardly as at 24 to facilitate the initial application of the clip over the edge of the supporting flange 1.

The base or body portion 21 of the clip includes an extension 26 which is return bent to define a bight portion 27 adapted to bear upon the adjacent wall of the inner roof rail member 3, as illustrated in Fig. 1, and which otherwise extends free to provide a yieldable spring arm 26. The fastener base 21 is provided on its sides with lateral portions which are bent outwardly in the same general direction to define a pair of resilient side arms 30 adapted to cooperate with the spring arm 26 therebetween in forming a resilient socket for receiving the end of the roof bow 10. The side arms 30 have their free edges inturned or inwardly curved to provide elongate shoulders 32 adapted to engage the roof bow in the grooves defined by the intersections of the ribs 12 with the rod portion 11, as seen in Fig. 5, to secure the roof bow against both outward and lateral displacement. Adjacent the lower ends of said inturned shoulders 32, there are provided projections defining abutments 34 for engaging the end of the roof bow 10 to support said roof bow against endwise movement relatively to the clip. The arrangement, accordingly, is such that there is provided a resilient socket composed of the resilient side arms 30 and the intermediate yieldable arm 26 extending transversely thereof and with the abutments 34 defining the bottom of such socket.

With the clip 20 thus provided, it will be understood that in mounting an end of the roof bow 10 in an installation as shown in Fig. 1, for example, the clip is readily connected to the end of the roof bow 10 in a quick and easy procedure in which the yieldable spring arm 26 is flexed inwardly as necessary to admit the end of the roof bow between said spring arm 26 and the inturned shoulders 32 on the side arms 30. As illustrated in Fig. 5, the clip is so positioned with respect to the roof bow 10 that the inturned shoulders 32 on the side arms 30 of the clip are received in and frictionally and grippingly engage in the grooves defined by the intersections of the ribs 12 with the half-round rod portion 11 of the roof bow while the yieldable spring arm 26 bears upon the flat outer surface 13 of said roof bow 10. In this relation, the clip 20 is pushed onto the end of the roof bow 10 until the abutments 34 engage the extremity of the roof bow in the fully connected relation of the clip thereon substantially as shown in Figs. 1 and 2.

With the clip so connected to the end of the roof bow, such end of the roof bow is easily and quickly mounted in the completed assembly shown in Fig. 1 simply by spreading the attaching leg 22 as necessary to slip the same over the edge of the flange 1 with the retaining tab 23 on said leg in line with the indent 5 in said flange. When the clip is pushed to final position on the flange 1, the locking or retaining tab 23 snaps into the indent 5 to lock the clip in applied position with the attaching leg 22 cooperating with the fastener base 21 in gripping engagement with said flange 1 in such applied position. Accordingly, the end of the roof bow 10, connected to said clip 20, is retained in proper mounted position on the flange 1 and supported and secured by the clip in such mounted position. In this relation, the abutments 34 on the side arms of the clip support the end of the roof bow 10 against endwise movement and with said end of the roof bow secured against both lateral and outward displacement relatively to the clip by the inturned shoulders 32, as aforesaid, and against inward displacement by the spring arm 26 engaging the flat outer face 13 of said roof bow, as illustrated in Fig. 5, such that displacement of the secured end of the roof bow in any lateral direction is prevented as supported by said abutments 34.

The clip fastener 20 preferably is constructed of relatively thin sheet metal the thickness of which is selected according to service requirements and the predetermined size of the parts to be secured. The clip fastener is most effective when provided of spring metal suitably spring tempered and otherwise treated to give the desired toughness and hardness, particularly in the case of devices which are used in heavy duty applications. A cheap and highly effective clip fastener may be provided from cold rolled metal such as cold rolled steel which is untempered but of a spring metal nature and capable of providing an effective and reliable securing device as and for the purposes described.

While the invention has been described with a specific example, such example is intended as an illustration only inasmuch as the invention fully contemplates various modifications which may be provided without departing from the spirit and scope of the invention.

What is claimed is:

1. A fastener comprising a piece of sheet metal providing a base having means for attaching the fastener to a support, and a spring arm extending from said base in spaced opposing relation thereto, side arms extending from the sides of said base on opposite sides of said spring arm, said side arms having free end portions extending toward and beyond said spring arm and said free end portions being bent inwardly toward each other to provide shoulders cooperating with said spring arm in providing a socket for receiving an object to be mounted on said support.

2. A fastener comprising a piece of sheet metal providing a base having means for attaching the fastener to a support, and a return bent portion at one end of said base providing a spring arm extending from said base in spaced opposing relation thereto, side arms extending from the sides of said base on opposite sides of said spring arm, said side arms having free end portions extending toward and beyond said spring arm and said free end portions being bent inwardly toward each other to provide shoulders cooperating with said spring arm in providing a socket for receiving an object to be mounted on said support, and an abutment on at least one of said shoulders for engaging said object receivable in said socket.

3. A fastener comprising a piece of sheet metal providing a base, an attaching portion at one end of said base for attaching the fastener to a support, a return bent portion at the other end of said base providing a spring arm extending from said base in spaced opposing relation thereto, side arms extending from the sides of said base on opposite sides of said spring arm, said side arms having free end portions extending toward and beyond said spring arm and said free end portions being bent inwardly toward each other to provide shoulders cooperating with said spring arm in providing a socket for receiving an object to be mounted on said support, and abutments on said shoulders for engaging said object receivable in said socket.

LAURENCE H. FLORA.
JOHN BALINT.

References Cited in the file of this patent

UNITED STATES PATENTS

| Number | Name | Date |
|---|---|---|
| 687,637 | Lambert | Nov. 26, 1901 |
| 839,654 | Seachrest | Dec. 25, 1906 |
| 965,658 | Reubel | July 26, 1910 |
| 1,198,929 | Knudsen | Sept. 19, 1916 |
| 1,644,287 | Spencer | Oct. 4, 1927 |
| 1,778,568 | Schulte | Oct. 14, 1930 |
| 2,099,649 | Hall | Nov. 16, 1937 |
| 2,239,978 | Sanford | Apr. 29, 1941 |
| 2,523,185 | Bedford | Sept. 19, 1950 |
| 2,565,746 | Turner | Aug. 28, 1951 |

FOREIGN PATENTS

| Number | Country | Date |
|---|---|---|
| 489,181 | Great Britain | of 1938 |